United States Patent
Gasaway et al.

[11] Patent Number: 6,079,695
[45] Date of Patent: Jun. 27, 2000

[54] BUTTERFLY VALVE CONSTRUCTION

[75] Inventors: Jerry Gasaway; David Stephan, both of North Little Rock; Filiberto Jimenez, Cabot, all of Ark.

[73] Assignee: Orbit Valve Company, Little Rock, Ark.

[21] Appl. No.: 09/046,194

[22] Filed: Mar. 23, 1998

Related U.S. Application Data

[60] Division of application No. 08/732,693, Oct. 18, 1996, which is a continuation-in-part of application No. 08/542,435, Oct. 12, 1995, Pat. No. 5,707,040.

[51] Int. Cl.[7] .................................................. F16K 1/22
[52] U.S. Cl. ........................................... 251/305; 251/214
[58] Field of Search .................................. 251/214, 305, 251/306

[56] References Cited

U.S. PATENT DOCUMENTS

| | | |
|---|---|---|
| 3,442,488 | 5/1969 | Adams . |
| 3,537,683 | 11/1970 | Snell, Jr. . |
| 4,162,782 | 7/1979 | Wilkins . |
| 4,265,426 | 5/1981 | Thurston et al. . |
| 4,281,817 | 8/1981 | Adams et al. . |
| 4,410,163 | 10/1983 | Scobie et al. . |
| 4,505,290 | 3/1985 | Scobie et al. . |
| 4,540,012 | 9/1985 | Bridges ............................. 251/214 X |
| 4,648,418 | 3/1987 | Scobie et al. . |
| 4,649,949 | 3/1987 | Scobie et al. . |
| 4,785,844 | 11/1988 | Pankov . |
| 4,828,221 | 5/1989 | Scobie et al. . |
| 4,944,489 | 7/1990 | Adams et al. . |
| 5,097,635 | 3/1992 | Beasley . |
| 5,244,183 | 9/1993 | Calvin et al. . |
| 5,305,787 | 4/1994 | Thygesen . |

OTHER PUBLICATIONS

Vanessa Series 30,000, "Principle of Operation", 1 page.
Adams, "Rotary Tight Shut–Off Valve Type MAK", Series 316, 1 page.
Vanessa Series 30,000 QTG, "Design and Construction", 1 page.

*Primary Examiner*—John Fox
*Attorney, Agent, or Firm*—Steve Rosenblatt; Duane, Morris & Heckscher

[57] ABSTRACT

A butterfly valve having a valve body with a seat therein and a valve disc carried on a rotatable shaft such that the valve disc can be moved into and away from sealing engagement with the valve body seat is provided with a removable and replaceable seat member forming the valve body seat and a removable and replaceable sealing surface member is mounted on the valve disc which is sealingly engageable with the seat member when the valve disc is moved into sealing engagement with the valve body seat. The valve body seat preferably is sized to be press fit into a recess in the valve body and retained therein without additional fasteners. This butterfly valve can be used in a single, double or triple offset valve and the valve can be attached to a pipe in any conventional manner. The valve seat material and the sealing surface material may be solid metal, a resistant material such as nylon or Teflon® may have a metal insert or may have a high temperature insert such as graphite.

3 Claims, 7 Drawing Sheets

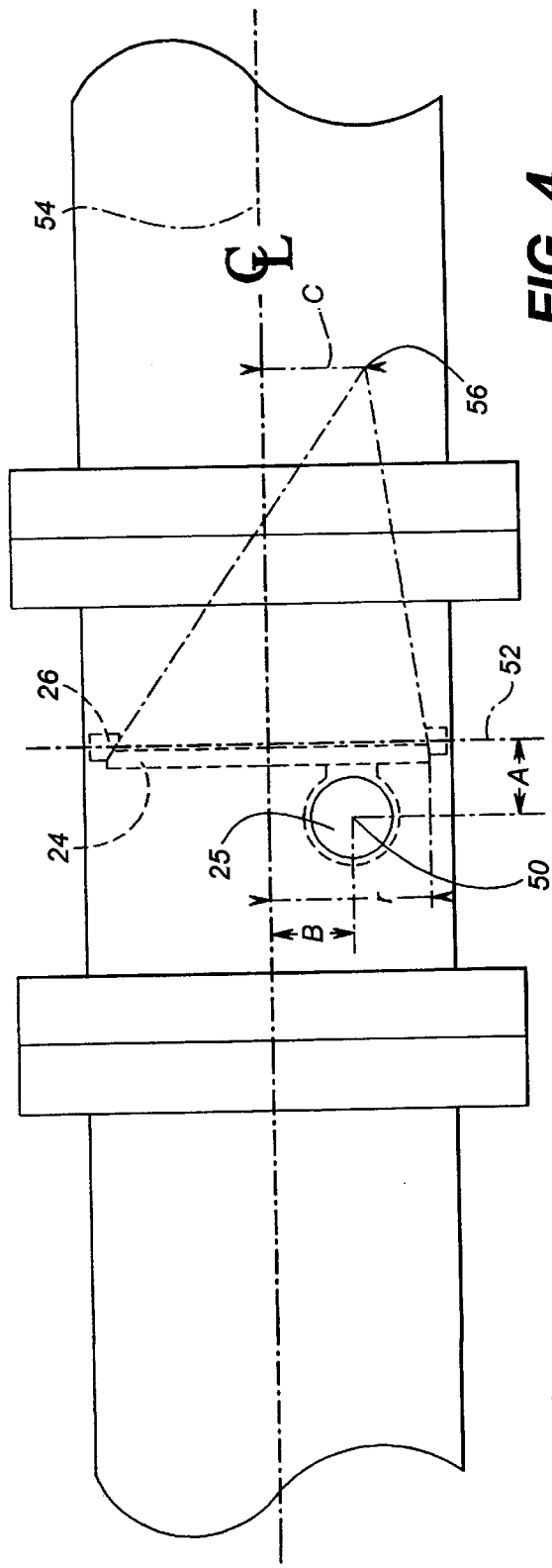
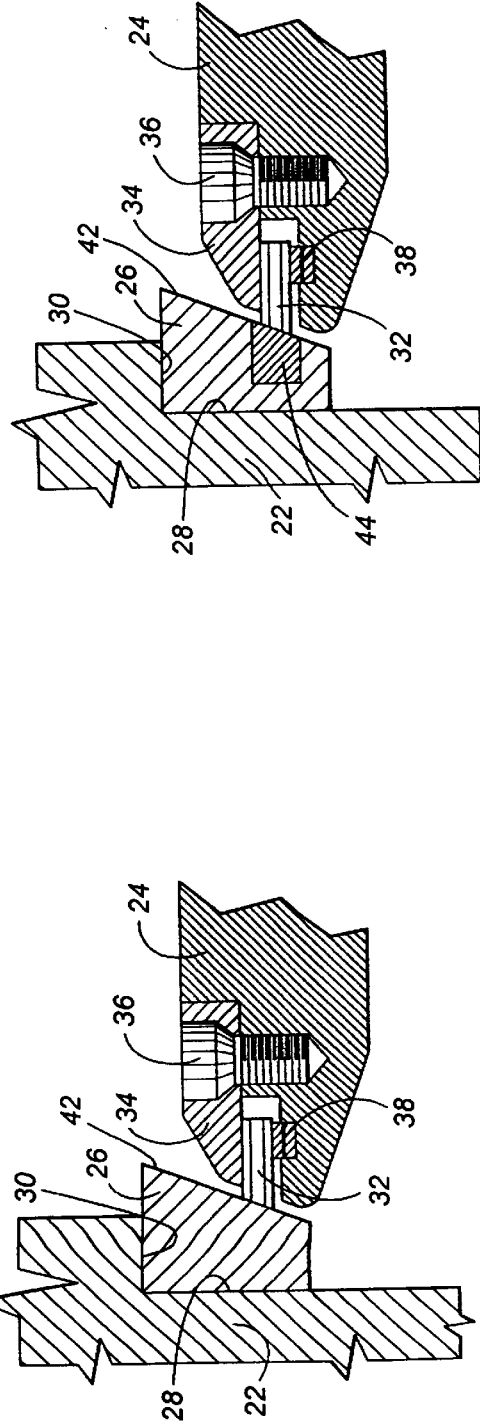
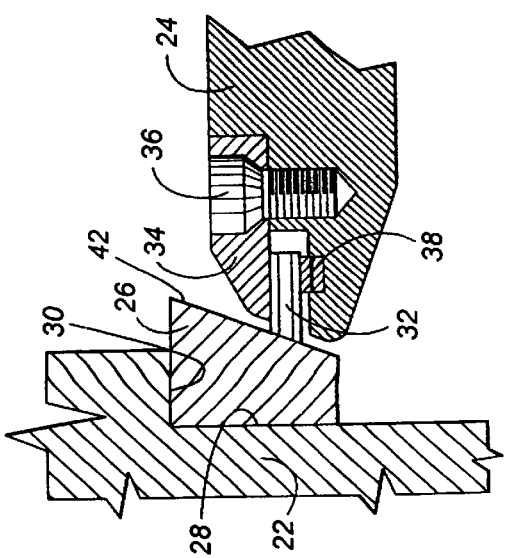

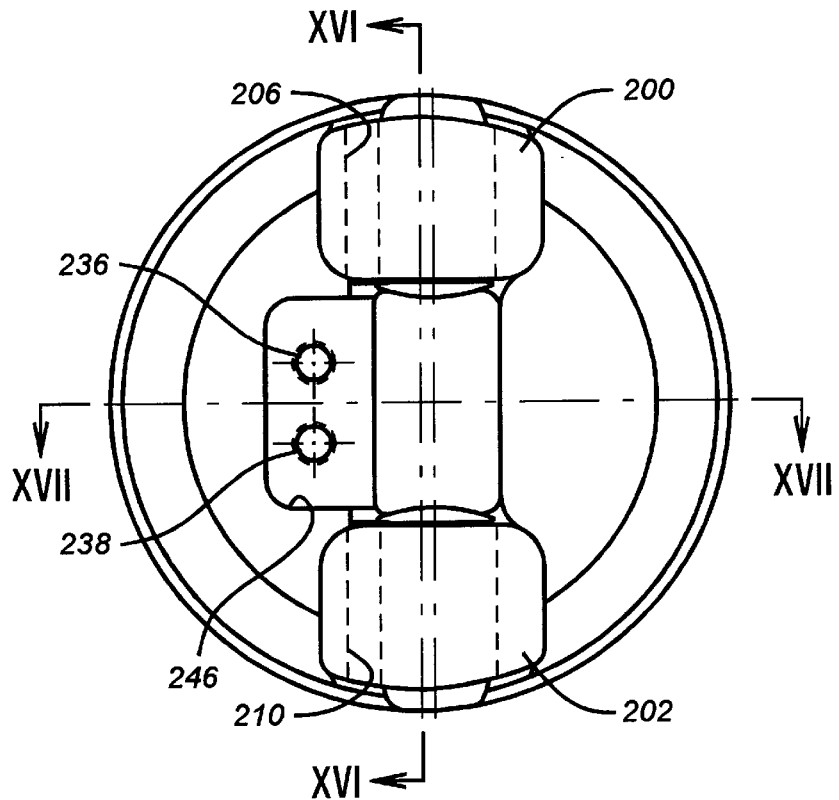
FIG. 15
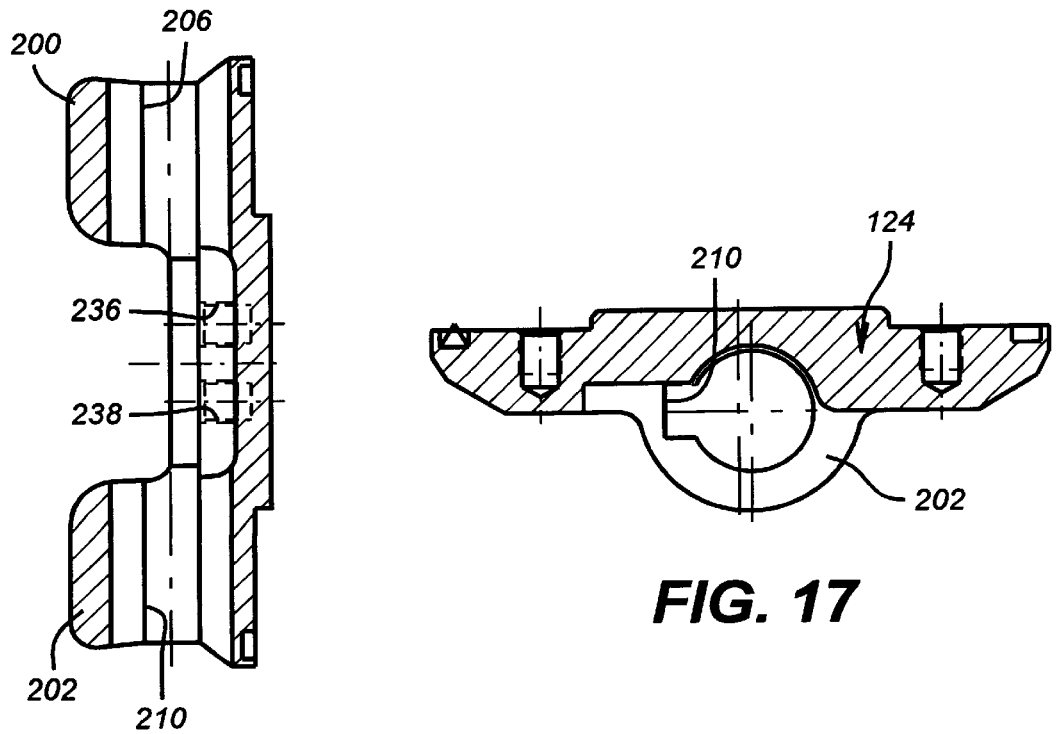
FIG. 16
FIG. 17

BUTTERFLY VALVE CONSTRUCTION

This is a division of application Ser. No. 08/732,693, filed on Oct. 18, 1996 which is a continuation-in-part of application Ser. No. 08/542,435, filed Oct. 12, 1995, now U.S. Pat. No. 5,707,040.

BACKGROUND OF THE INVENTION

The present invention relates to sealing members for butterfly valves, and more specifically to removable and replaceable valve sealing members.

Butterfly valves are well known wherein a valve body, which is generally a cylindrical member for allowing fluid to flow therethrough, has a valve seat formed therein and a movable valve disc is carried on a rotatable shaft such that the valve disc can be moved into and away from sealing engagement with the valve body seat. Thus, in such a valve there are two sealing surfaces, one sealing surface is the valve seat in the valve body, while the other sealing surface is carried on a periphery of the valve disc. When the disc is brought into contact with the seat, a seal is formed.

In one type of butterfly valve presently available, the valve seat is formed integrally with the valve body and the sealing member on the valve disc is replaceable and is held onto the valve disc by a retainer ring held in place by cap screws.

In another type of butterfly valve presently available, the valve disc comprises a single unitary member and a removable and replaceable seal member is mounted to the valve body by means of a retaining ring held in place in the valve body by cap screws. In this type of arrangement the cross sectional flow area through the valve body is reduced in order to provide sufficient area for the cap screws to engage into the valve body and for the retaining ring to hold the ring-like seal member in place.

Butterfly valves can be used in a wide variety of installations within a pipeline, wherein the pipeline may carry a wide range of different fluids. In some instances the fluids may be corrosive or may have a relatively high temperature or relatively low temperature, and even might carry some solids. In the operation of a butterfly valve, due to the fluid and material flowing through the valve body when the disc is in an open position, sometimes the sealing surfaces carried by the disc or within the valve body becomes cut, scratched or damaged in some other fashion. When this occurs it is necessary to repair the sealing surfaces in order to be assured that complete sealing will be provided. However, in present constructions it is possible to only replace one of the two sealing surfaces, thus preventing complete repairability of the butterfly valve when both surfaces are damaged.

In order to provide enhanced sealing and reduced wear between the movable disc and the valve body seat, special geometries and constructions are used. For example, in some constructions the valve disc is carried on a shaft and the shaft rotates to move the disc relative to the valve body seat, however, the shaft is offset longitudinally (relative to the fluid flow centerline of the valve body) from the sealing area between the disc and the valve body seat. Thus, an axis of rotation of the disc shaft is parallel to, but offset from, a plane in which the valve disc engages the valve body seat.

A second offset may be provided for the valve disc shaft. This second offset is a lateral offset such that although the axis of rotation of the valve shaft is perpendicular to the flow through centerline of the valve body, the valve disc shaft is laterally offset so that its axis of rotation does not intersect the centerline of the valve body.

Third, it has been found that by making the valve seat have a frusto-conical shape and having the valve disc have a complementary frusto-conical shape enhances the sealing characteristics of the butterfly valve. A third offset is to incline the angle of the frusto-conical shapes such that if the shape was projected out to an apex, the apex would be offset from the centerline of the valve body.

The valve bodies are connected at each end to a pipe forming a pipeline, and the connection can be one of a variety of different connection types. For example, the pipe ends may be flanged and the valve body also flanged with a series of apertures therethrough for receiving mounting bolts to secure the valve body within the pipeline. Alternatively, instead of a full flange, a series of angularly spaced lugs may be provided around the periphery of each end of the valve body to align with similar lugs or a flange on the pipe for receiving securing bolts. Also, the valve body may be a wafer style which is relatively thin and which is positioned between flanges in the pipe and is clamped between the flanges. Further, the valve body may be arranged to be welded to the pipe or even threaded to the pipe.

SUMMARY OF THE INVENTION

The present invention provides for an improved butterfly valve construction wherein the seat in the valve body has a removable and replaceable ring shaped seat seal member and also the valve disc is provided with a removable and replaceable ring shaped sealing surface member such that either sealing member, or both, may be removed and replaced as needed either to repair each of the sealing members due to damage or to allow changing the sealing member materials to suit particular pipeline conditions. Sometimes it becomes apparent after the pipeline has been in service for a while that the seat materials originally selected are not appropriate for the fluid being directed through the pipeline. By use of the present invention, the user may replace both sealing members with a more corrosive resistant material or a sealing member suitable for higher or lower temperature service as is necessary.

The present invention also allows the use of seat materials both in the valve body and on the valve disc that are not weldable type materials or that are not weld compatible with the valve body material. Also, the present invention allows for the use of resilient inserts such as nylon, Teflon®, etc. for solid metal seats and also for seats with metal inserts or high temperature material such as graphite. Thus, the present invention allows for a wide range of flexibility in material selection and replacement and can be used in any type of butterfly valve construction.

The present invention provides a floating disc design wherein the disc is keyed to the valve stem by two disc keys and positioned centrally to the valve seat by a center key. In operation, the disc keys carry the torsional load during rotation of the disc into engagement with the seat while the center key allows the disc to "float" to seek its center with respect to the seat. This floating aspect is important in a metal-seated valve which may be subjected to temperature variations. The center key allows the disc to move slightly which can accommodate temperature variations and thermally induced dimensional changes, which is required to achieve drop-tight sealing.

Additionally, the invention provides a valve stem which is normally retained by the disc keys and the center key, and also, in an unlikely event that all three keys are sheared, the stem is still retained by a gland retainer which fits into a groove formed in the valve stem. The gland retainer is composed of two pieces. These two pieces are held together by a packing flange. Furthermore, the inside diameter of the packing flange is larger than the outside diameter of the packing gland. If the assembler were to forget to install the gland retainer, the packing gland will immediately be expelled by line pressure, thereby indicating a problem in assembly. The groove in the valve stem is sized such that excessive actuating torque on the stem will result in the stem shearing above the retaining shoulder of the stem before failing the disc keys. Additionally, in the present invention the valve seat is captured between the body recess and the valve stem so that if the valve is accidently over pressured, the valve seat cannot be expelled from the valve body either upstream or downstream.

BRIEF DESCRIPTION OF THE DRAWINGS

FIG. 2 is a partial side sectional view of the valve seat area of the valve of FIG. 1.

FIG. 3 is a partial side sectional view of the valve seat area as an FIG. 2, showing an optional sealing insert.

FIG. 4 is a plan view of a pipeline with a butterfly valve therein and illustrating three offsets.

FIG. 15 is an elevational view of the valve disc shown in FIG. 13.

FIG. 16 is a sectional view taken generally along the line XVI—XVI of FIG. 15.

FIG. 17 is a sectional view taken generally along line XVII—XVII of FIG. 15.

DETAILED DESCRIPTION OF THE PREFERRED EMBODIMENTS

Figure 1:
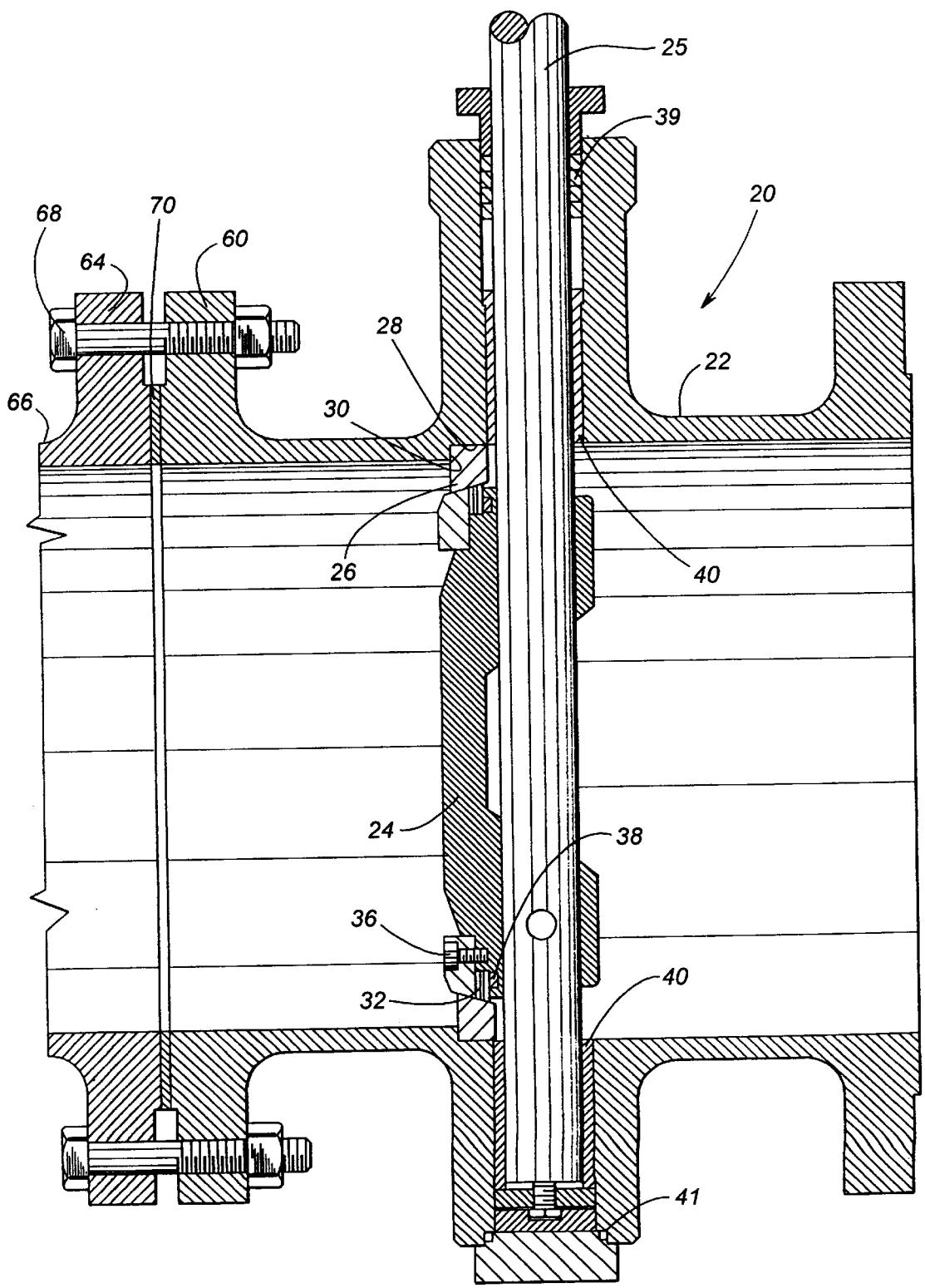
FIG. 1 is a side sectional view of a butterfly valve embodying the principles of the present invention.

In FIG. 1 there is illustrated a butterfly valve generally at 20 which is comprised of a valve body 22 and a movable valve disc 24. The valve disc 24 is carried on a rotatable shaft 25. The valve body 22 is provided with a removable and replaceable seat member 26 which is sized to be press fit into a recess 28 and against a shoulder 30 in the valve body and retained therein without additional fasteners. The seat member 26 preferably is a one piece ring shaped member, although it may have an insert as described in more detail below.

The valve disc 24 is provided with a ring shaped removable and replaceable sealing surface member 32 which is held onto the disc by means of a retaining ring 34 which is secured by cap screws 36 into the valve disc 24. The retaining ring 34 presses the sealing surface member 32 against a gasket 38 so that there is no leakage occurring between the sealing surface member 32 and the disc 24. The valve shaft 25 is journaled in the valve body 22 by use of bushings 40 and sealed by packing 39 and gasket 41 to avoid any leakage at the valve shaft.

As best seen in FIG. 2, typically the seat member 26 has a frusto-conical shape and presents an angled surface 42 facing toward the disk 24. Also, the sealing surface member 32 has a complementary frusto-conical shape such that when the disc 24 is closed into engagement with the valve body 22 the two angled surfaces will wedge together to form a tight seal area.

The seat member 26 and the sealing surface member 32 may be formed from a variety of materials to accommodate particular fluids and temperatures of fluids flowing through the valve body 22, such as a resilient material like synthetic rubber, nylon or Teflon®, or a solid metal material formed of a particular metal which, in some instances, may need to be resistant to corrosive characteristics of the fluid. Also, as shown in FIG. 3, the valve seat member 26 may be provided with an insert 44 such as a resilient material like synthetic rubber, nylon or Teflon® or a high temperature material like graphite or a metal insert retained within a different metal material forming the seat member 26. Thus, a wide range of conditions may be accommodated by selecting the appropriate material for the seat member 26 and the sealing surface member 32. Also, both of these sealing members 26, 32 can be removed and replaced if conditions of the fluid carried through the valve body 22 change or if it is determined after an initial operating period that different materials would be more suitable for use in connection with the fluids being directed through the valve body, in addition to being changed or replaced due to damage to either or both members.

In order to enhance the sealing characteristics of the butterfly valve 20 and to reduce wear and rubbing action between the valve body seat member 26 and the sealing surface member 32, it may be desirable to provide one, two or even three offsets. These offsets are illustrated in FIG. 4. There it is seen that the valve shaft 25 has an axis of rotation 50 which is offset by a distance A from a plane 52 passing through the sealing engagement area between the valve seat member 26 and the sealing surface member 32. A second offset is shown wherein the axis of rotation 50 is offset laterally by a distance B from a centerline 54 of the valve body such that, although the axis of rotation 50 is perpendicular to the valve body centerline 54, they do not intersect.

A third offset is shown which relates to the frusto-conical shape of the valve seat member 26 wherein, when the conical shape is projected out to an apex 56, that apex is offset by a distance C from the centerline 54 of the valve body 22. The present invention accommodates any one or any combination of these offsets. If the third offset is utilized, then the angle of the inwardly directed face 42 of the valve seat member 26 changes in relation to the sidewall of the valve body 22 around the circumference of the seat member 26. This same changing angle is complemented by the sealing surface member 32. Thus, these two sealing members must be mounted into the valve body 22 and onto the valve disc 24, respectively, in the appropriate angular position so that the two angled mating surfaces will be properly aligned. This angular positioning may be accomplished by means of recesses and detents, markings or other alignment features.

Figures 5, 6, 7:
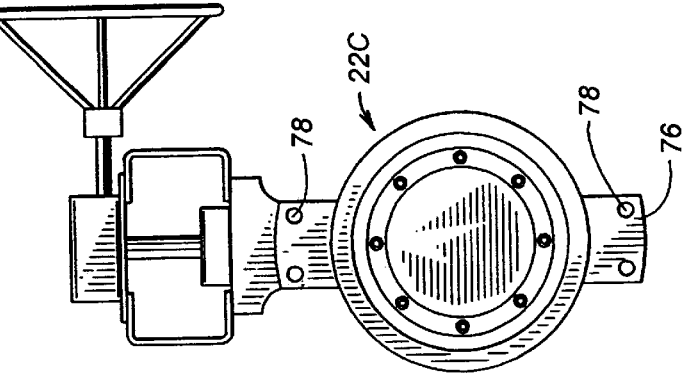
FIG. 5 is an end elevational view of a butterfly valve embodying the principles of the present invention utilizing a flanged valve body.
FIG. 6 is an end elevational view of a butterfly valve embodying the principles of the present invention utilizing a lugged valve body.
FIG. 7 is an end elevational view of a butterfly valve embodying the principles of the present invention utilizing a wafer style valve body.

The present invention can be utilized in any style of valve body available. For example, FIG. 5 illustrates a butterfly valve body 22A having a full flange 60 with a series of angularly spaced holes 62 therethrough. As shown in FIG. 1, such an arrangement is provided so that the flange 60 will abut with a flange 64 on a pipe 66. Such flange 64 also is apertured so that a clamping bolt 68 can hold the two flanges together with a sealing gasket 70 interposed therebetween.

FIG. 6 illustrates a somewhat similar valve body 22B which, instead of a full flange, contains a series of angularly spaced lugs 72 which have holes 74 therethrough, again for receiving fastening bolts from a pipe. In this type of arrangement the valve body 22B may have a relatively short axial dimension along its flow centerline 54 such that the lugs 72 are clamped between adjacent end flanges in the connecting pipes.

FIG. 7 illustrates a wafer style valve body 22C in which the axial length of the valve body is short and the valve body is sandwiched between two flanged pipe ends. A single bottom lug 76 is provided and holes 78 are provided at the top and bottom of the valve body 22C for receipt of clamping and aligning bolts from the pipe flanges.

Figure 8:
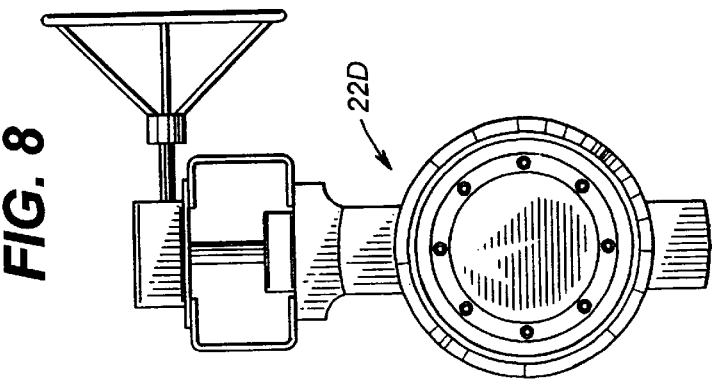
FIG. 8 is an end elevational view of a butterfly valve embodying the principles of the present invention utilizing a weldable or threadable valve body.

FIG. 8 illustrates a valve body 22D that is designed to be connected to adjacent pipes either by welding or by a threaded connection.

Figure 10:
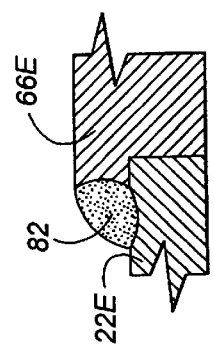
FIG. 10 is a partial sectional view of a socket weld connection between a valve body and a pipe.
Figure 9:
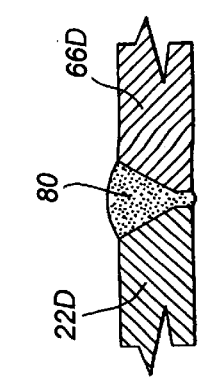
FIG. 9 is a partial sectional view of a butt weld connection between a valve body and a pipe.

FIG. 9 illustrates a butt weld between a valve body wall 22D and a pipe wall 66D. The ends of the two walls are beveled to receive the weld material 80. A second type of weld connection is illustrated in FIG. 10 which is referred to as a socket weld in which a pipe 22E is received in a socket in a valve body 66E and weld material 82 holds the two walls together.

Figure 11:
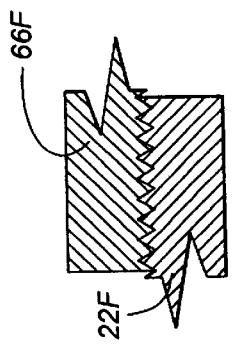
FIG. 11 is a partial sectional view of a threaded connection between a valve body and a pipe.

FIG. 11 illustrates a threaded connection between a valve body wall 66F and a pipe wall 22F.

Figure 12:
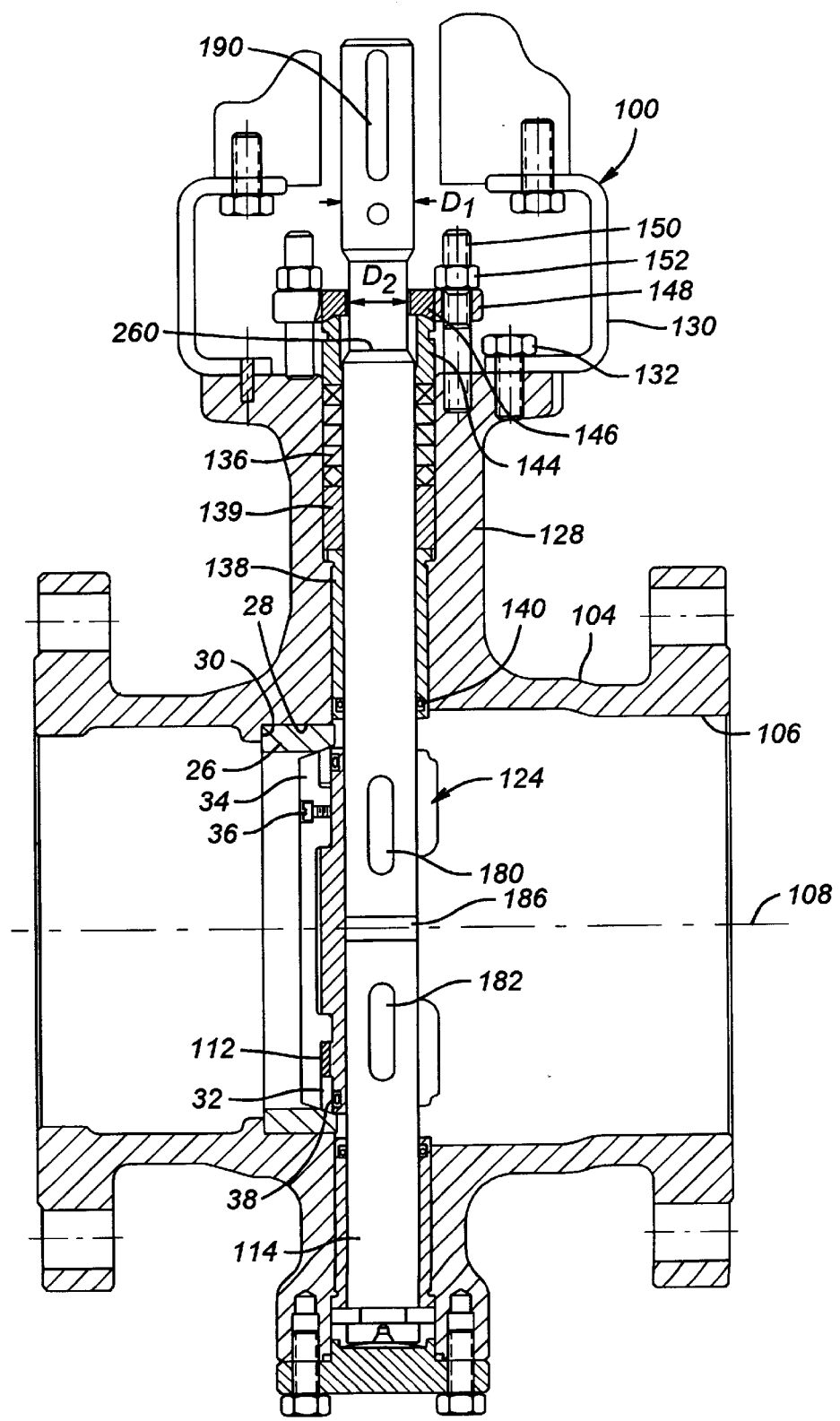
FIG. 12 is a longitudinal sectional view of an alternate embodiment valve of the present invention.

FIG. 12 shows an alternate embodiment valve 100. The valve 100 includes a valve body 104 having a through bore 106 with a center line 108. Components or features which are common with the previously described embodiments use the same item indicators.

The seal ring 32 is properly located with respect to the retainer 34 by a seal ring locater 112. A valve stem 114 penetrates into the bore 106 and is fixed to a valve disc 124 as described below. The body 104 includes a stem mounting bore 128 onto which is mounted an actuator adapter 130 by bolts 132. Within the bore 128 is located packing rings 136, bushings 138, 139 and a bushing/stem seal 140. For compressing the packing within the bore 128 is arranged a packing gland 144, a gland retainer 146 and a packing flange 148, stacked in series. Two or more packing studs 150 with respective nuts 152 are arranged threaded into the bore 128 for exerting a downward thrust upon the packing flange 148 to compress the gland retainer 146 onto the packing gland 144 to compress the packing rings 136. The gland retainer 146 is composed of two half circular pieces having an assembled inside diameter smaller than an overall outside diameter D1 of the shaft 114. To accommodate this gland retainer, a groove 152 is formed in the shaft 114 having a diameter D2 smaller than D1. The gland retainer 146 has an inside diameter smaller than D1 end larger than D2.

Figure 18:
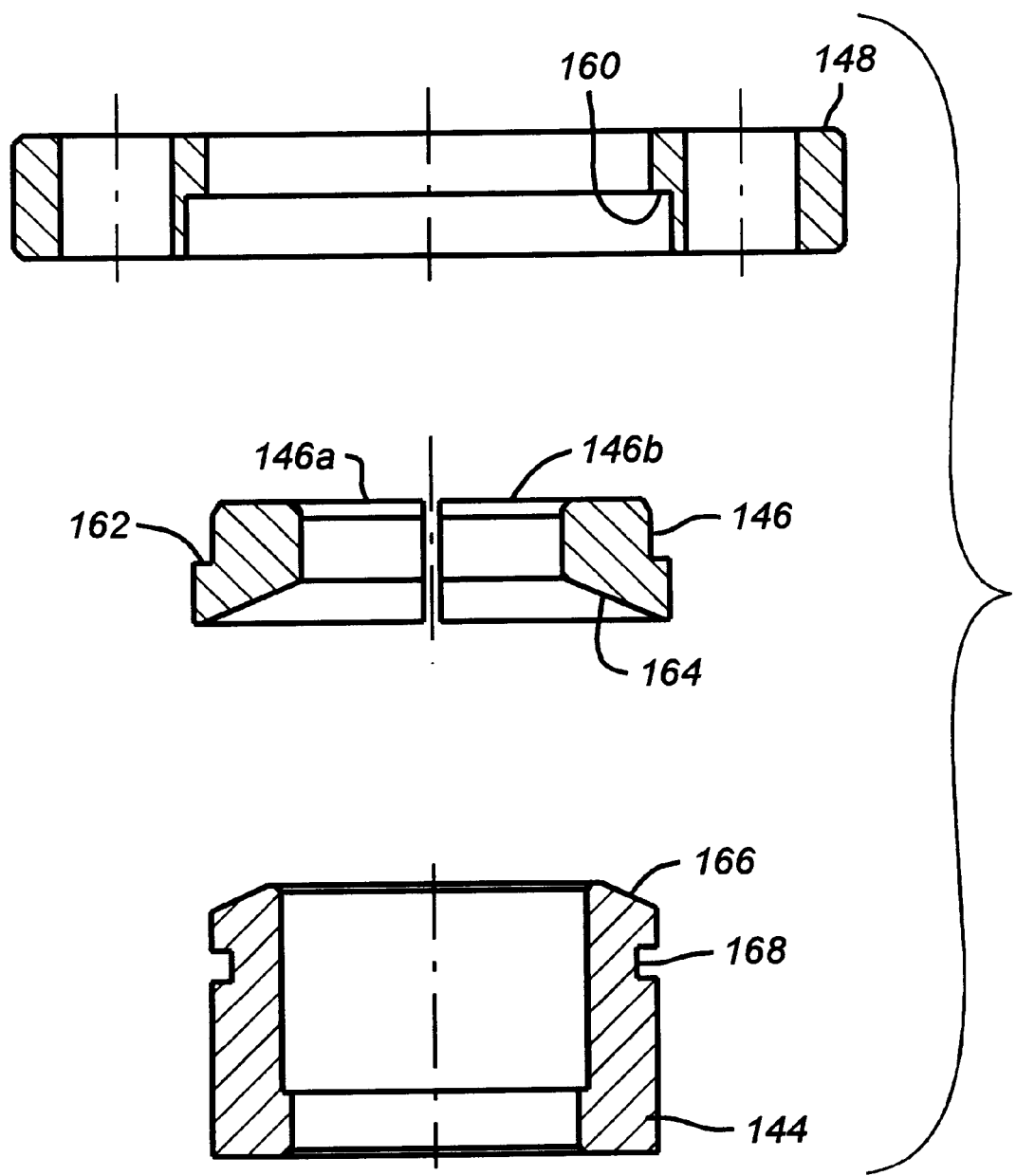
FIG. 18 is an exploded sectional view of a portion of the valve shown in FIG. 12.

As shown in FIG. 18 the packing flange 148 includes a recessed shoulder 160 which bears against a surrounding ledge 162 of the gland retainer 146. The gland retainer 146 has a downwardly and inwardly tapered seat 164 which bears against a complimentary tapered surface 166 of the packing gland 144. The gland retainer 146 is provided in two pieces 146a, 146b so that assembly around the shaft within the groove 152 can be accomplished. The packing flange 148 thereby holds the two pieces 146a, 146b together when assembled.

FIG. 12 further shows that the shaft includes oblong key ways 180, 182 on opposite sides of the center line 108, and a square cut horizontal key way 186 on the center line 108. An upper key way 190 is provided for connection of an actuator (not shown).

Figure 13:
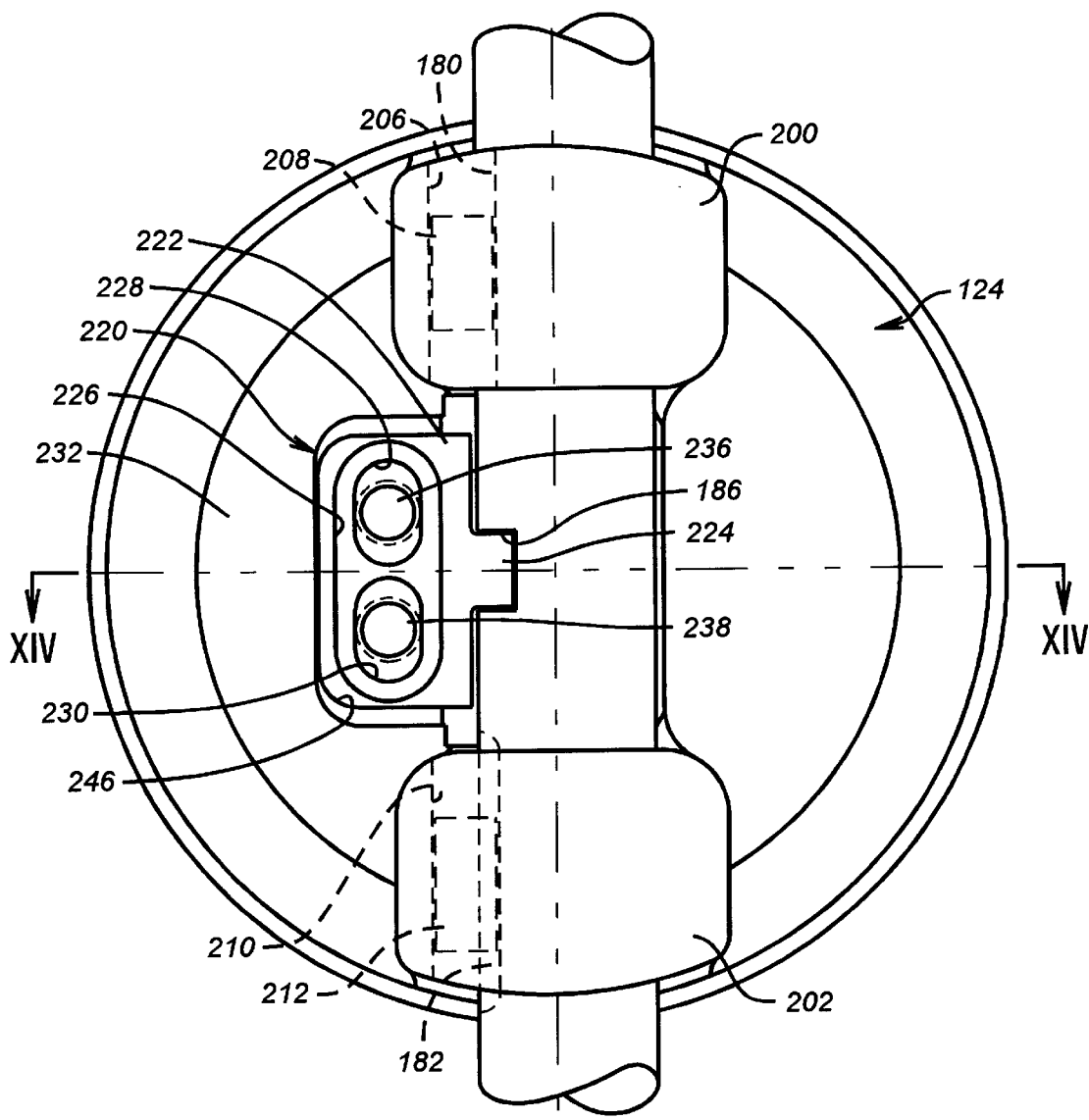
FIG. 13 is partial right side view of the valve shown in FIG. 12.

As shown in FIG. 13, the disc 124 includes an upper hub 200 and a lower hub 202 for receiving the shaft 114 for connection to the disc 124. The upper hub 200 includes a vertical groove 206 for receiving a plate shaped key 208 therein. The plate shaped key 208 is held within the oblong key way 180 of the shaft thereby locking the shaft torsionally to the upper hub 200. The lower hub 202 also includes a slot 210 for receiving a second plate shaped key 212 therein. The second plate shaped key 212 is also inserted into the oblong key way 182 to lock the shaft 114 to the lower hub 202 torsionally. The hubs 200, 202 thus surround the shaft 114 and are locked rotationally thereto by the keys 208, 212.

Figure 14:
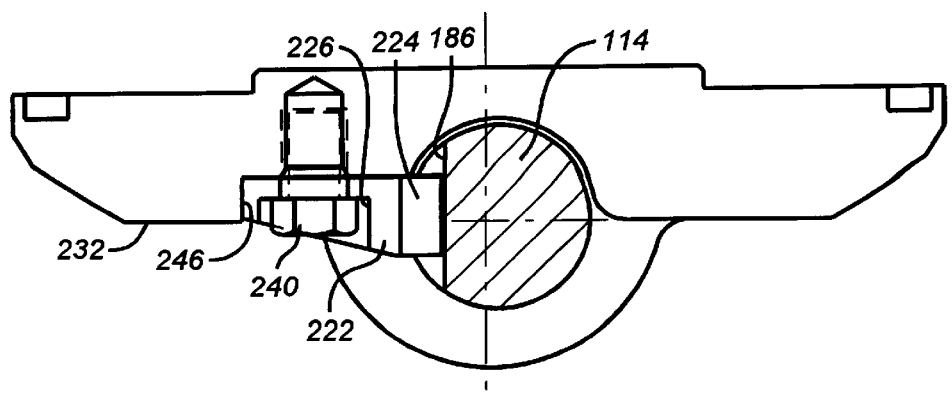
FIG. 14 is a sectional view taken generally along line XIV—XIV of FIG. 13.

A center key assembly 220 is provided between the upper and lower hubs 200, 202. The assembly includes a generally rectangular plate 222 with an extending key portion 224 for interfitting into the groove 186 provided in the shaft 114. The plate includes an oval shaped recess portion 226 having two oval shaped apertures 228, 230 arranged therethrough. The disc 124 includes, through a surface 232 thereof, first and second threaded bolt holes 236, 238 in registry with the oval apertures 228, 230. Two bolts or machine screws 240 (shown in FIG. 14) attach the plate 222 to a complimentary recessed area 246 in the surface 232 of the disc 124. The key portion 224 and the groove 186 are sized with respect to each other to allow a certain amount of vertical movement of the disc 124 with respect to the shaft 114 such that the disc 124 when pressing tightly against the seat 26 can center itself. Additionally, the oval apertures 228, 230 allow a precise initial positioning of the key portion 224 within the slot 186.

The method of mounting of the disc 124 to the stem 114 is important in that in a metal-seated valve subject to temperature variations, a means of accommodating thermally induced dimensional changes is advantageous to achieve drop-tight sealing. It is also important to note that it is important in this art that provision be made to prevent a stem 114 from being projected out of the bore 128 under influence of pressure within the valve. These are known as "blow out proof" stems. The present invention provides advantageous protection against such an occurrence. In the unlikely event that all three keys, 208, 212, 224 are sheared, the stem would still be prevented from being projected from the bore 128 by the flange retainer 146 which has an inner diameter smaller than the diameter D1 of the shaft at the location 260 as shown in FIG. 12. Thus, many levels of protection against this occurrence are provided.

Additionally, it is important to note that the seat 26 is provided trapped between the shoulder 30 of the body 104 and the stem 114. Thus, even if the valve is over pressured, the seat 26 cannot be blown down stream to where further damage could occur. The seat is trapped between the shoulder 30 and the stem 114.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A butterfly valve having a valve body with a valve seat therein and a valve disc assembly carried on a valve stem such that valve disc assembly can be moved into and away from sealing engagement with said valve seat, comprising:

a valve body having a through bore to be connected on opposite sides to flow conduits, and a side bore for receiving a valve stem into said through bore, said valve seat mounted within said through bore, and a valve disc assembly carried on said valve stem to be rotationally sealingly engaged to said valve seat upon rotation of said valve stem;

packing material arranged around said valve stem within said side bore;

a packing gland assembly arranged above said packing material for retaining said packing material within said side bore, said packing gland assembly comprising a packing gland, a gland retainer having an inside diameter smaller than an overall diameter of said stem, a packing flange arranged above and partially around said gland retainer having an inside diameter greater than an overall diameter of said packing gland, and a fastener assembly for drawing said packing flange downwardly towards said valve disc to compress said packing material; and said stem having a reduced diameter, and said gland retainer arranged to encircle said reduced diameter.

2. The butterfly valve according to claim 1, wherein said packing gland assembly comprises a gland arranged beneath said gland retainer and against said packing.

3. The butterfly valve according to claim 1, wherein said packing flange comprising an inside stepped profile and said gland retainer comprises an outside stepped profile, said inside step profile and said outside step profile interlock together to allow said packing flange to encircle said gland retainer to prevent separation of said gland retainer into two pieces.

* * * * *

UNITED STATES PATENT AND TRADEMARK OFFICE
Certiicate

Patent No. 6,079,695                                                           Patented: June 27, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David Stephan, North Little Rock, Arkansas.

Signed and Sealed this Twenty-Eighth Day of November, 2000.

*GREGORY L. HUSON*
*Supervisory Patent Examiner*
*Art Unit 3753*